United States Patent
Wen et al.

(10) Patent No.: US 7,948,427 B2
(45) Date of Patent: May 24, 2011

(54) RADAR DETECTION METHOD AND APPARATUS USING THE SAME

(75) Inventors: Chun Hsien Wen, Chupei (TW); Jiunn Tsair Chen, Chupei (TW)

(73) Assignee: Ralink Technology Corp., Chupei, Hsinchu Hsien (TW)

( * ) Notice: Subject to any disclaimer, the term of this patent is extended or adjusted under 35 U.S.C. 154(b) by 74 days.

(21) Appl. No.: 12/240,228

(22) Filed: Sep. 29, 2008

(65) Prior Publication Data

US 2009/0146863 A1    Jun. 11, 2009

(30) Foreign Application Priority Data

Dec. 6, 2007  (TW) .............................. 96146460 A

(51) Int. Cl.
   *H04K 3/00*    (2006.01)
(52) U.S. Cl. ........................................................ 342/20
(58) Field of Classification Search ...................... 342/20
   See application file for complete search history.

(56) References Cited

U.S. PATENT DOCUMENTS

| | | | | |
|---|---|---|---|---|
| 6,292,129 | B1 * | 9/2001 | Matsugatani et al. | 342/70 |
| 6,697,013 | B2 * | 2/2004 | McFarland et al. | 342/159 |
| 6,831,589 | B2 * | 12/2004 | Shearer, III | 342/20 |
| 7,155,230 | B2 | 12/2006 | Tsien | |
| 2005/0130677 | A1 * | 6/2005 | Meunier et al. | 455/456.6 |
| 2006/0064726 | A1 * | 3/2006 | Loner | 725/68 |
| 2006/0119473 | A1 * | 6/2006 | Gunderson et al. | 340/435 |
| 2006/0209999 | A1 * | 9/2006 | Meixner et al. | 375/346 |
| 2008/0075038 | A1 * | 3/2008 | Jin et al. | 370/329 |

OTHER PUBLICATIONS

M. Wen, L. Hanwen, "Radar Detection for 802.11a Systems in 5GHz Band," International Conference on Wireless Communications, Networking and Mobile Computing, 2005.

* cited by examiner

*Primary Examiner* — Thomas H Tarcza
*Assistant Examiner* — Timothy A Brainard
(74) *Attorney, Agent, or Firm* — Connolly Bove Lodge & Hutz LLP

(57) ABSTRACT

A method for detecting radar signal comprises the steps of: sampling a received signal so as to obtain a plurality of sampling values; taking an absolute value of the sampling values so as to obtain at least two parameters; and determining whether the received signal includes radar signals in accordance with the at least two parameters.

13 Claims, 6 Drawing Sheets

RADAR DETECTION METHOD AND APPARATUS USING THE SAME

BACKGROUND OF THE INVENTION

1. Field of the Invention

The present invention relates to a radar detection method and apparatus, and more particularly to a radar detection method capable of detecting radar signals during normal operations.

2. Description of the Related Art

There is a widespread development in wireless communication devices using unauthorized frequency. For example, the Federal Communications Commission (FCC) released 2,525 MHz bandwidth from 5.470 MHz to 5.725 MHz in 2003 for unlicensed national information infrastructure (U-NII). However, the signals of U-NII devices at about 5 GHz are easily interfered with by existing radar signals. FIG. 1 shows a typical U-NII and radar system. The transmitting scope of a U-NII system 11, e.g., a wireless local area network 11 composed of a plurality of U-NII devices 15 and a wireless base station 14, is overlapped with that of radar systems 12, 13 so that their signals conflict with each other. To resolve such a matter, the FCC regulates that all U-NII devices using bandwidth between 5.25 GHz and 5.35 GHz and between 5.470 GHz and 5.725 GHz have to adopt dynamic frequency selection (DFS) technology so as to hop frequency to a conflict-free channel when a frequency conflict occurs. Thus the conflict issue caused by radar signals around 5 GHz is resolved.

While DFS solves the problem of frequency conflict, the issue of effectively implementing the detection of conflicting radar signals remains without solution. 802.11h, the specification defined by the Institute of Electrical and Electronics Engineers (IEEE), proposes that the radio local area network (RLAN) around 5 GHz should not only adopt DFS technology to avoid conflict with radar signals and to uniformly allocate bandwidth, but also should suspend current signal transmission in order to detect radar signal to reduce possible signal interference. However, the above suggestion will largely decrease throughput of signal transmission and does not meet the user's demand.

M. Wen, L. Hanwen, "Radar detection for 802.11a systems in 5 GHz band," International Conference on Wireless Communications, Networking and Mobile Computing, 2005, pp. 512-514 presented an algorithm for detecting radar signals. The algorithm detects power variation whose position is close to sampling signals. However, it normally fails when RLAN and radar signals stay in the same power level.

U.S. Pat. No. 6,697,013 discloses another algorithm of detecting radar signal, which achieves the detection based on signal correlation, pulse width and zero crossing. However, its hardware complexity is considerable because both real and imaginary parts of the frequency and time domains have to be compared.

SUMMARY OF THE INVENTION

The method for detecting radar signal in accordance with one embodiment of the present invention comprises the steps of: sampling a received signal so as to obtain a plurality of sampling values; taking an absolute value of the sampling values so as to obtain at least two parameters; and determining whether the received signal includes radar signals in accordance with the at least two parameters.

The method for detecting radar signal in accordance with another embodiment of the present invention comprises the steps of: sampling a received signal so as to obtain a plurality of sampling values; taking an absolute value of the sampling values so as to obtain one parameter; and identifying whether the received signal includes radar signals by comparing the parameter and known patterns of radar signals.

The apparatus for radar signal detection in accordance with one embodiment of the present invention comprises a parameter extractor and a signal classifier. The parameter extractor is configured to extract parameters from the absolute value of a received signal. The signal classifier is con figured to compare the extracted parameters with existing parameter patterns of radar signals so as to determine whether the received signal includes radar signals.

BRIEF DESCRIPTION OF THE DRAWINGS

The invention will be described according to the appended drawings in which.

PREFERRED EMBODIMENT OF THE PRESENT INVENTION

Figure 1:
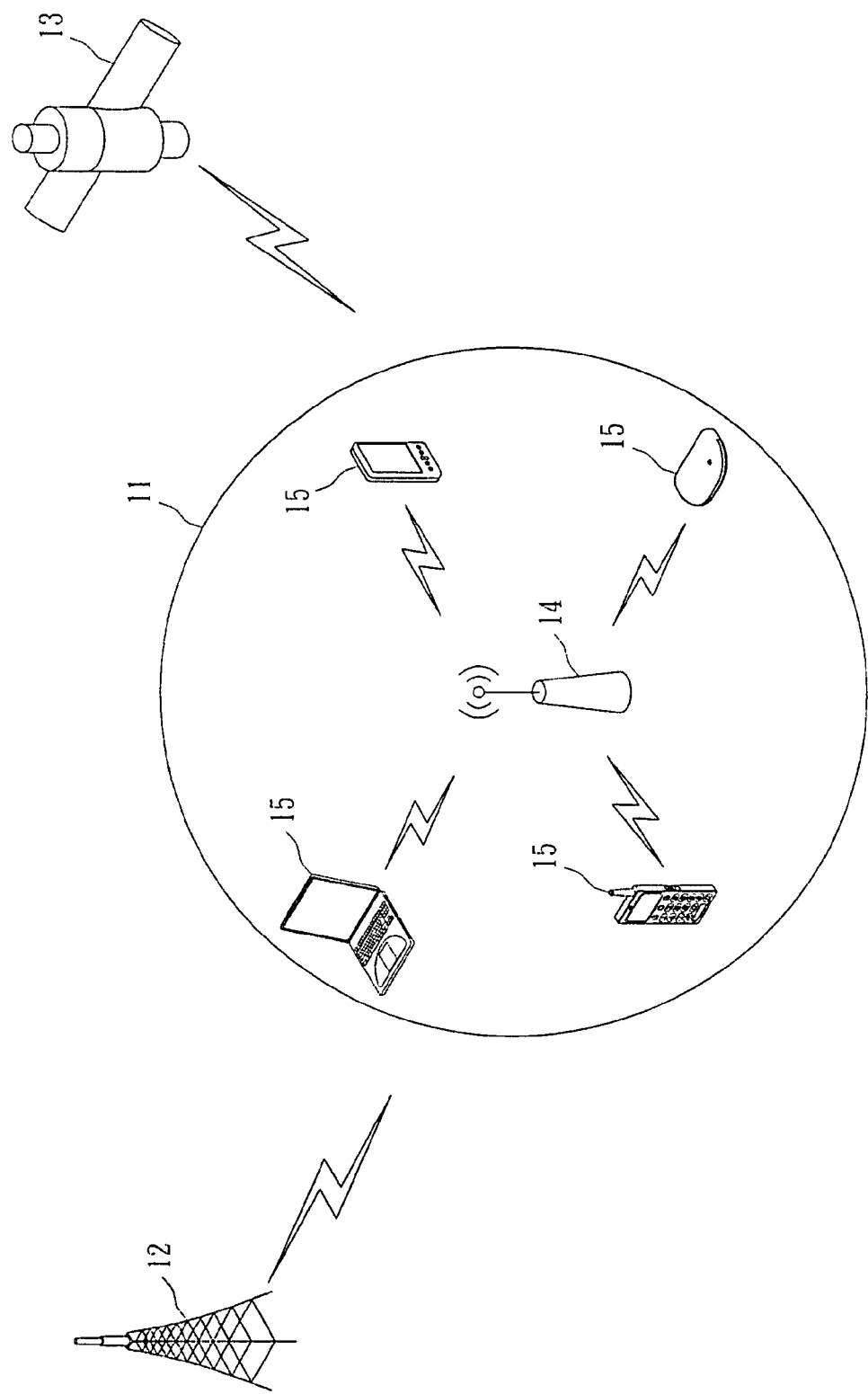
FIG. 1 shows a typical U-NII and radar system.
Figure 2:
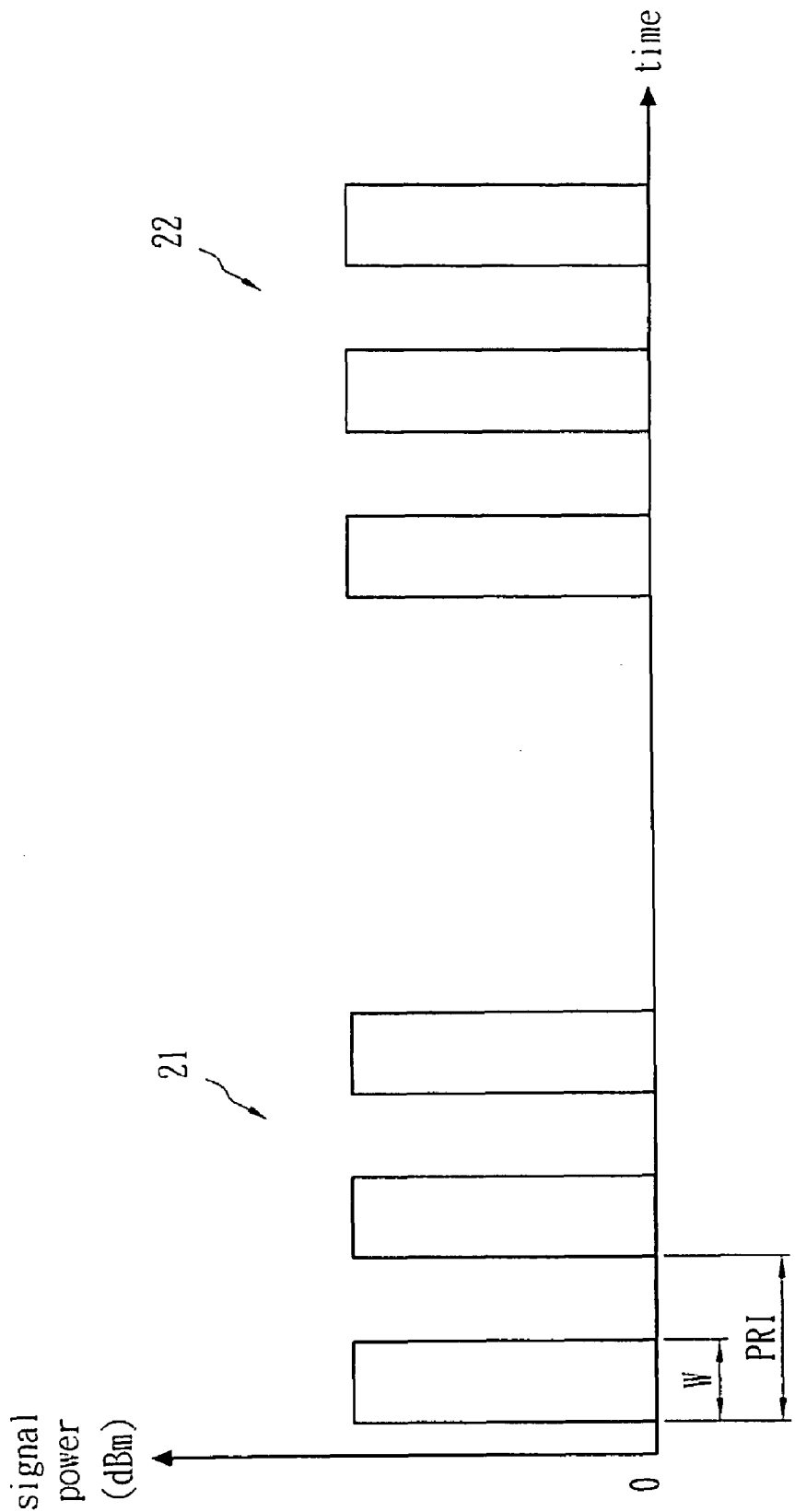
FIG. 2 shows characteristics of radar signals.
Figure 4:
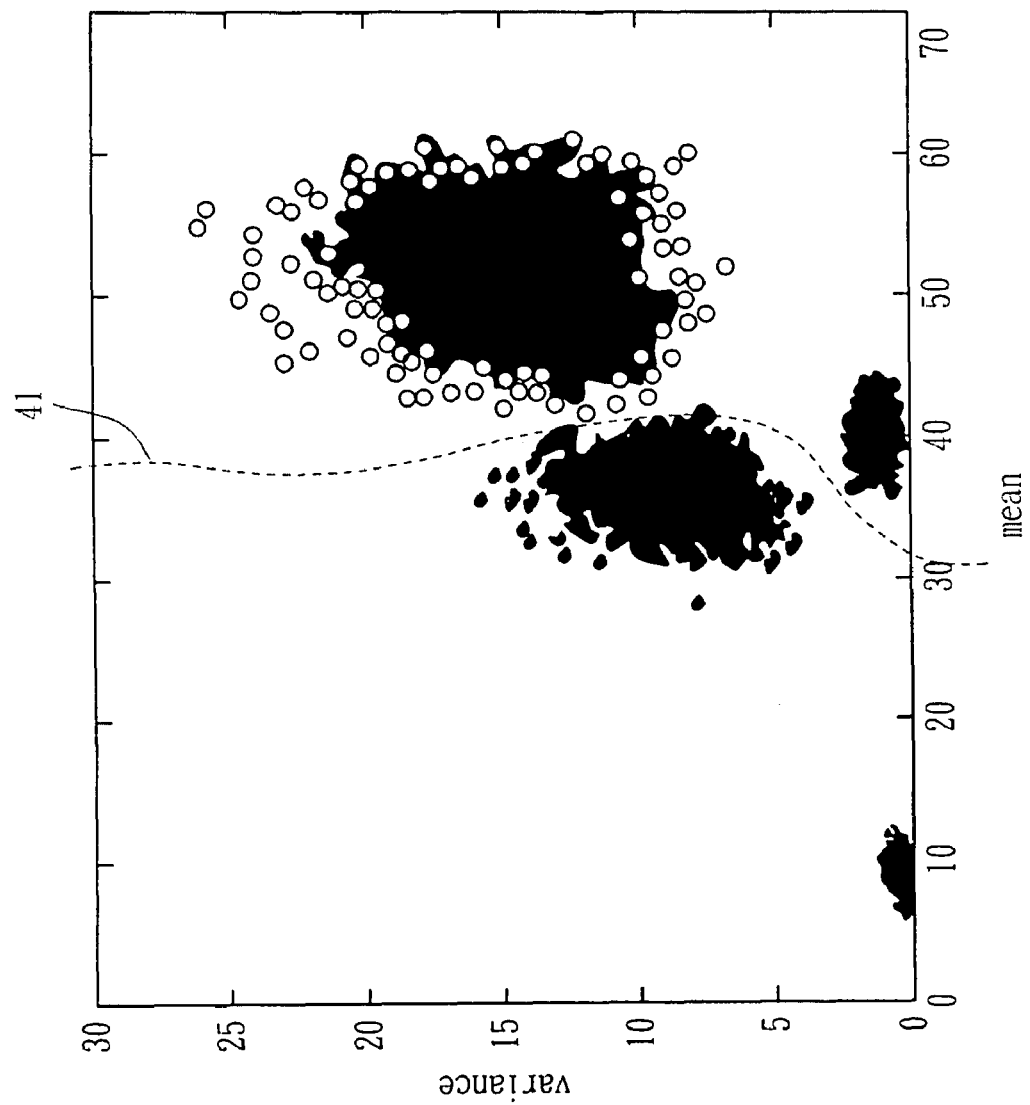
FIG. 4 shows different group distributions of radar signals.

Generally, radar signals possess specific signal characteristics. As shown in FIG. 2, a radar signal possesses two series of bursts 21, 22, and each burst has the same pulse interval W and pulse repetition interval (PRI). Radar signals also have specific statistic characteristics. As shown in FIG. 4, if the mean and variance of the absolute values of radar signals are placed as X and Y coordinates respectively, the radar signals will appear in some group distribution. Under the situation that the received signals are partitioned into four classes, i.e., radar signal plus OFDM signal plus white Gaussian noise, radar signal plus white Gaussian noise, OFDM signal plus white Gaussian noise, and white Gaussian noise only, if the OFDM signal and white Gaussian noise have a higher ratio compared to the power of the radar signals, four specific groups will distinctly appear in the spatial parameter projection. Therefore in determining the extraction of the parameters of the received signals, if the mean and variance of the received signals are selected for extraction, the radar signals can be easily distinguished by a plurality of threshold value. The present invention uses the above features to detect the existence of the radar signals.

Figure 3:
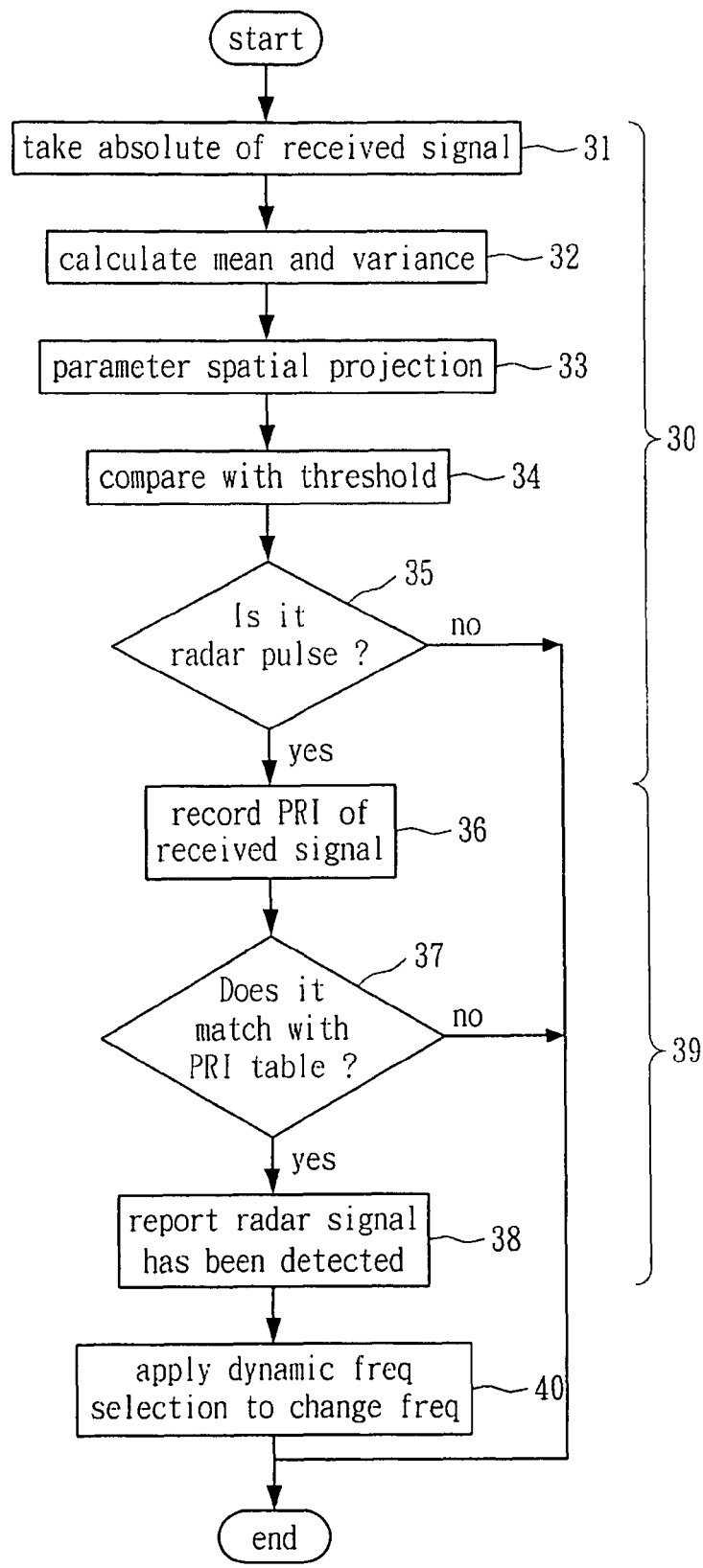
FIG. 3 shows a flowchart of radar signal detection in accordance with an embodiment of the present invention.

FIG. 3 shows a flowchart of radar detection in accordance with an embodiment of the present invention. The flowchart mainly includes a detection step 30, a verification step 39 and a frequency-changing step 40. The verification step 39 is optional, and is primarily used to prevent the detection step 30 from acting erroneously. In step 31, the absolute value of a received signal is taken to reduce the design complexity. In step 32, the mean and variance of the absolute value are taken. In step 33, a spatial projection for the mean and variance is taken. In step 34, a threshold is set and used to determine whether the received signal includes a radar signal. In step 35, if the received signal is determined to include a radar signal, then step 36 is performed, calculating and recording the pulse interval of the received signal. In step 37, the pulse interval is compared with an existing PRI table, where the PRI table includes mapping of a variety of corresponding radar parameters, such as those regulated by United States Federal Communication Committee (FCC) or European Telecommunications Standard Institute (ETSI). If a match is found, then step 38 is performed, reporting that the received signals do include radar signals. In step 40, after it is confirmed that the received signal includes radar signal, the dynamic frequency selection is used to alter the frequency.

The threshold set in step 34 can be determined by the parameters adopted. As shown in FIG. 4, a critical curve 41 partitions the plurality of groups into two parts, and the right part is radar signals detected. Additionally, the content of step 32 can be set to only calculate the mean or variance thereof. Correspondingly, in step 33, a spatial projection for the mean and variance is taken. In step 34, a threshold is set and used to determine whether the received signal includes a radar signal.

Figure 5:
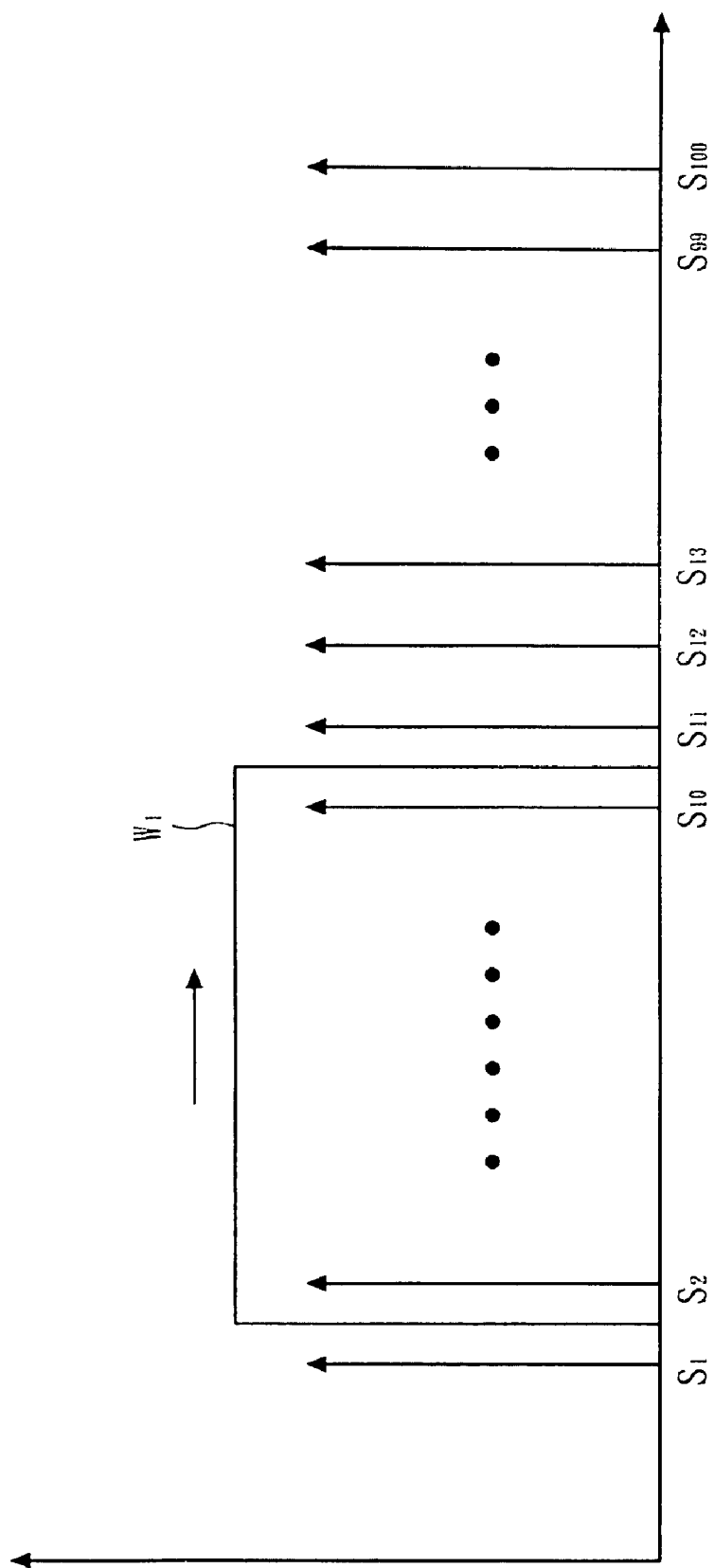
FIG. 5 shows an illustration of calculating the mean and variance of received signals according to one embodiment of the present invention.

FIG. 5 shows an illustration of calculating the mean and variance of received signals according to one embodiment of the present invention, where $S_1$ to $S_{100}$ represent sampling values of the received signals. This embodiment uses a sliding window $W_1$ to sample ten points at a time and then calculates their mean and variance. For example, starting from $S_1$, the sliding window $W_1$ calculates the mean and variance of samples $S_1$ to $S_{10}$. In the next action, the mean and variance of samples $S_2$ to $S_{11}$ are calculated, then the mean and variance of samples $S_3$ to $S_{12}$ are calculated, and so on. Whether it is found that the received signals include radar signals depends on the calculated mean and variance.

Figure 6:
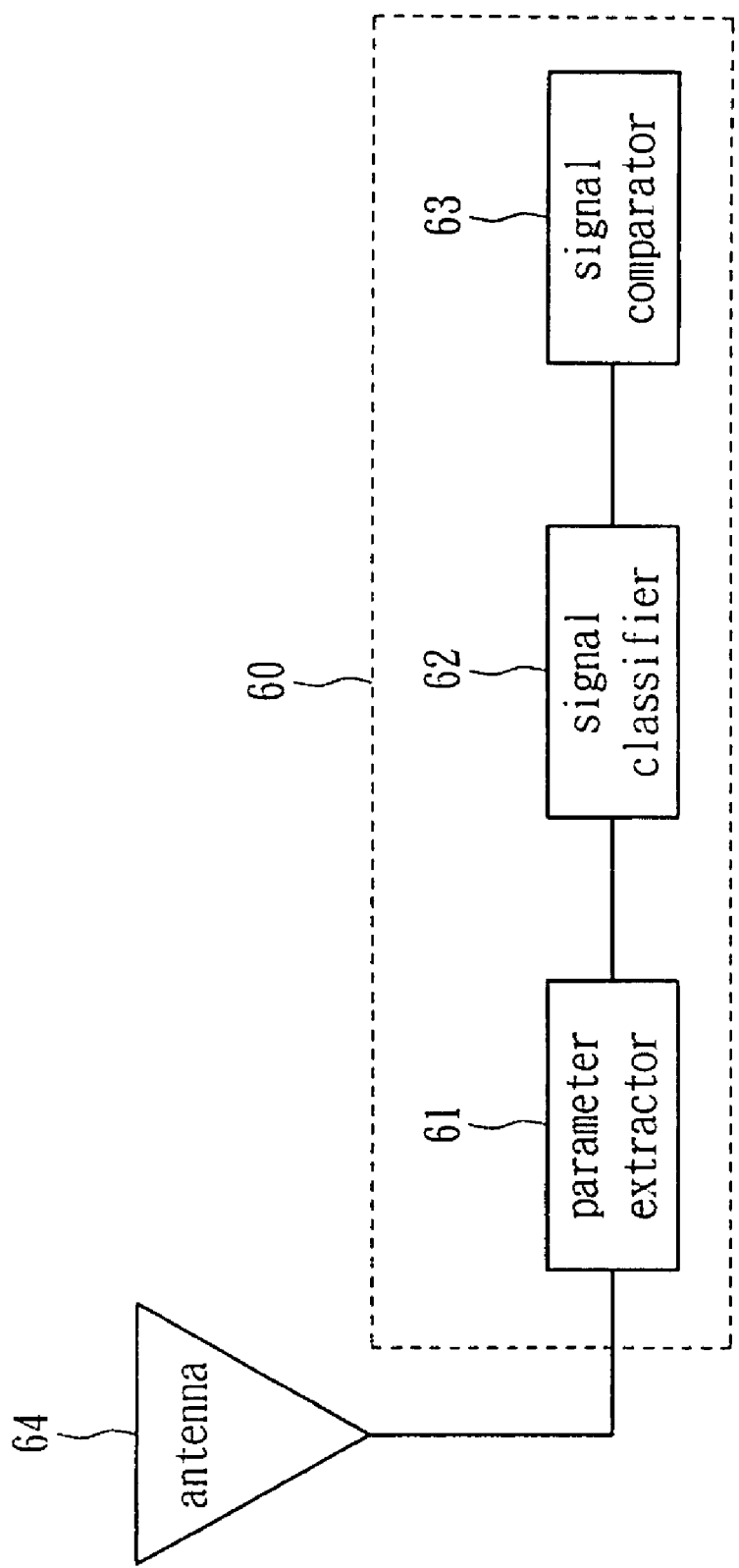
FIG. 6 shows an illustration of a radar signal detector according to one embodiment of the present invention.

FIG. 6 shows an illustration of a radar signal detector according to one embodiment of the present invention. The detector 60 includes a parameter extractor 61, a signal classifier 62 and a signal comparator 63. The parameter extractor 61 calculates the mean and variance of signals received from an antenna 64. The signal classifier 62 determines whether the received signal includes radar signals by mapping the mean and variance in comparison with at least one predetermined threshold. If the received signal is determined to be radar signal, the signal comparator 63 records the time received, calculates a PRI value, and compares this with a PRI table including mapping of a plurality of known radar signals. If the comparison is positive, then it is determined that the received signal includes radar signals.

In comparison with prior art, the present invention need not stop transmitting signals upon detection of radar signals; therefore the throughput will not decrease. In addition, the present invention need not increase or decrease power upon detecting radar signals. Under an interfering and high noise environment, the present invention can still detect the existence of radar signals. Furthermore, the present invention does not use a complex formula, and is easy to implement with software and hardware and thus easily applied in DFS technology. In particular, the present invention can be easily applied in DFS technology for 5 GHz U-NII devices.

The above-described embodiments of the present invention are intended to be illustrative only. Numerous alternative embodiments may be devised by persons skilled in the art without departing from the scope of the following claims.

What is claimed is:

1. A method for detecting radar signal, comprising the steps of:
   sampling a received signal so as to obtain a plurality of sampling values;
   performing a calculation based on absolute values of the sampling values so as to obtain at least two parameters, wherein the at least two parameters are statistical characteristics of the sampling values; and
   determining whether the received signal includes radar signals in accordance with a group distribution of the at least two parameters.

2. The method of claim 1, wherein the at least two parameters are mean and variance.

3. The method of claim 1, further comprising the step of examining pulse intervals of the received signal.

4. The method of claim 3, further comprising the steps of:
   recording the pulse intervals; and
   comparing the pulse intervals with a pulse interval table to determine whether the received signal includes radar signals, wherein the pulse interval table comprises corresponding radar parameters.

5. The method of claim 4, wherein the pulse interval table includes parameters of radar signals regulated by the United States Federal Communication Committee or European Communication Standard Institute.

6. The method of claim 1, wherein the step of determining whether the received signal includes radar signals in accordance with the at least two parameters comprises:
   setting at least one threshold; and
   comparing the distribution of the at least two parameters with the at least one threshold so as to determine whether the received signal includes radar signals.

7. The method of claim 1, further comprising a step after determining whether the received signal includes radar signals in accordance with the at least two parameters, the step comprising:
   applying a dynamic frequency selection to alter frequency if the received signal includes radar signal.

8. The method of claim 1, wherein the step of performing a calculation based on absolute values of the sampling values so as to obtain at least two parameters uses a sliding window to obtain the at least two parameters.

9. An apparatus for radar signal detection, comprising:
   a parameter extractor configured to extract at least two parameters from the absolute value of a received signal, wherein the at least two parameters are statistical characteristics of the absolute value; and
   a signal classifier configured to compare a group distribution of the at least two extracted parameters with existing parameter patterns of radar signals so as to determine whether the received signal includes radar signals.

10. The apparatus of claim 9, wherein the extracted parameters are mean and variance.

11. The apparatus of claim 9, wherein the signal classifier compares the extracted parameter with at least one threshold so as to determine whether the received signal includes radar signals.

12. The apparatus of claim 9, further comprising:
    a signal comparator configured to record and compare the pulse intervals of the received signal with a pulse interval table.

13. The apparatus of claim 12, wherein the pulse interval table includes parameters of radar signals regulated by the United States Federal Communication Committee or European Communication Standard Institute.

* * * * *